(12) United States Patent
Du et al.

(10) Patent No.: US 9,826,040 B2
(45) Date of Patent: Nov. 21, 2017

(54) SYSTEM AND METHOD FOR PREVENTING COLLISIONS IN A HIERARCHICAL NETWORK

(75) Inventors: Shu Du, Richardson, TX (US); Susan Yim, Plano, TX (US); Xiaolin Lu, Plano, TX (US); David M. Wilson, Missouri City, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 639 days.

(21) Appl. No.: 13/010,253

(22) Filed: Jan. 20, 2011

(65) Prior Publication Data
US 2011/0185075 A1 Jul. 28, 2011

Related U.S. Application Data

(60) Provisional application No. 61/299,219, filed on Jan. 28, 2010.

(51) Int. Cl.
*H04L 12/28* (2006.01)
*H04L 29/08* (2006.01)
*H04L 12/40* (2006.01)
*H04L 29/06* (2006.01)
*H04L 5/00* (2006.01)

(52) U.S. Cl.
CPC ...... *H04L 67/125* (2013.01); *H04L 12/40013* (2013.01); *H04L 67/325* (2013.01); *H04L 69/28* (2013.01); *H04L 5/0044* (2013.01)

(58) Field of Classification Search
CPC ..... H04W 84/18; H04W 24/02; H04W 48/16; H04W 48/08; H04W 72/1278; H04W 28/06; H04W 40/32; H04W 40/246; H04W 72/04; H04W 72/0446; H04W 74/04; H04W 74/08; H04L 12/413; H04L 12/44; Y02B 60/50; Y02B 90/246; Y04S 20/42
USPC ............... 370/443, 447, 445, 442, 345, 350; 375/257; 455/502; 324/66
See application file for complete search history.

(56) References Cited

U.S. PATENT DOCUMENTS 7,949,356 B2 * 5/2011 Yonge et al. ................. 455/502
2002/0067736 A1 * 6/2002 Garcia-Luna-Aceves H04W 72/1257
370/442

(Continued)

OTHER PUBLICATIONS

Prime Project "Prime Technology White Paper" Jul. 21, 2008 v1.0 pp. 1-25.*

(Continued)

*Primary Examiner* — Alex Skripnikov
*Assistant Examiner* — Lionel Preval
(74) *Attorney, Agent, or Firm* — Gregory J. Albin; Charles A. Brill; Frank D. Cimino

(57) ABSTRACT

A system and method for reducing transmission collisions. In one embodiment, a transmitter for communicating of a smart grid power line network includes an arbiter. The arbiter is configured to select a transmission interval during which the transmitter can transmit. The interval is selected from a plurality of available transmission intervals reserved for contending transmissions, and selected based on a level of a hierarchical network at which the transmitter is located. The interval selected is different from any interval used by a different transmitter spaced two hierarchical levels away from the level of the hierarchical network at which the transmitter is located.

15 Claims, 3 Drawing Sheets

(56) References Cited

U.S. PATENT DOCUMENTS

| | | | | |
|---|---|---|---|---|
| 2003/0103521 | A1* | 6/2003 | Raphaeli et al. | 370/445 |
| 2009/0010276 | A1* | 1/2009 | Yonge, III | H04L 12/2801 370/447 |
| 2009/0011782 | A1* | 1/2009 | Yonge et al. | 455/502 |
| 2009/0016314 | A1* | 1/2009 | Kim | H04W 72/1257 370/345 |
| 2011/0064072 | A1* | 3/2011 | Wang | H04L 12/2697 370/350 |
| 2011/0285379 | A1* | 11/2011 | Giubbini et al. | 324/66 |
| 2012/0294377 | A1* | 11/2012 | Vijayasankar et al. | 375/257 |

OTHER PUBLICATIONS

Prime Consortium, "Draft Standard for Powerline-Related Intelligent Metering Evolution," Mar. 2009, 189 pages.

\* cited by examiner

SYSTEM AND METHOD FOR PREVENTING COLLISIONS IN A HIERARCHICAL NETWORK

CROSS-REFERENCE TO RELATED APPLICATION

The present application claims priority to U.S. Provisional Patent Application No. 61/299,219, filed on Jan. 28, 2010; which is hereby incorporated herein by reference in its entirety.

BACKGROUND

The electric grid is a transmission and distribution system that provides electricity from generators to consumers. Smart grid technology adds intelligence and networking to the electric grid to optimize grid operation and maintenance.

The smart-metering network is one component of the smart grid. In a typical smart-metering network, electricity (or other utility) meters transmit real-time meter readings through power lines to the grid control system. The meter readings provide valuable real-time utility control and billing information to the utility provider. When transmitting over power lines, power efficiency considerations and noise in the power lines limit the range of direct transmission. Therefore, a typical smart metering network adopts a hierarchical tree-like topology.

SUMMARY

A system and method for reducing transmission collisions in a hierarchical network. In one embodiment a method includes providing a communication time frame with a time interval reserved for contending transmissions. The time interval reserved for contending transmissions is divided into a plurality of time sub-intervals. A node of the hierarchical network determines which one of the time sub-intervals corresponds to a level of the node in the hierarchical network. The node transmits data during the time interval reserved for contending transmissions only during the determined one of the time sub-intervals that corresponds to the level of the node in the hierarchical network.

In another embodiment, a transmitter includes an arbiter. The arbiter is configured to divide a communication time frame portion reserved for contending transmissions into a plurality of time sub-intervals. The arbiter is also configured to determine which one of the time sub-intervals corresponds to a level of a hierarchical network in which the transmitter is located. The arbiter is further configured to enable the transmitter during the time frame portion reserved for contending transmissions only during the determined one of the time sub-intervals that corresponds to the level of the hierarchical network at which the transmitter is located.

In yet another embodiment, a system includes a plurality of nodes. The nodes are communicatively coupled and arranged in a network having at least three hierarchical levels. Each node includes partitioning logic and selection logic. The partitioning logic is configured to segment a portion of a communication time frame reserved for contending transmissions into a plurality of sub-portions. Each sub-portion corresponding to one of the hierarchical levels of the network. The selection logic configured to select one of the sub-portions during which to transmit. The selection is based on the hierarchical level of at which the node is located.

In a further embodiment, a transmitter for communicating on a smart grid power line network includes an arbiter configured to select a transmission interval reserved for contending transmissions during which the transmitter can transmit. The interval is selected from a plurality of available transmission intervals reserved for contending transmissions based on a level of a hierarchical network at which the transmitter is located. The interval selected by the arbiter is different from any interval used by a different transmitter spaced two hierarchical levels away from the level of the hierarchical network at which the transmitter is located.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
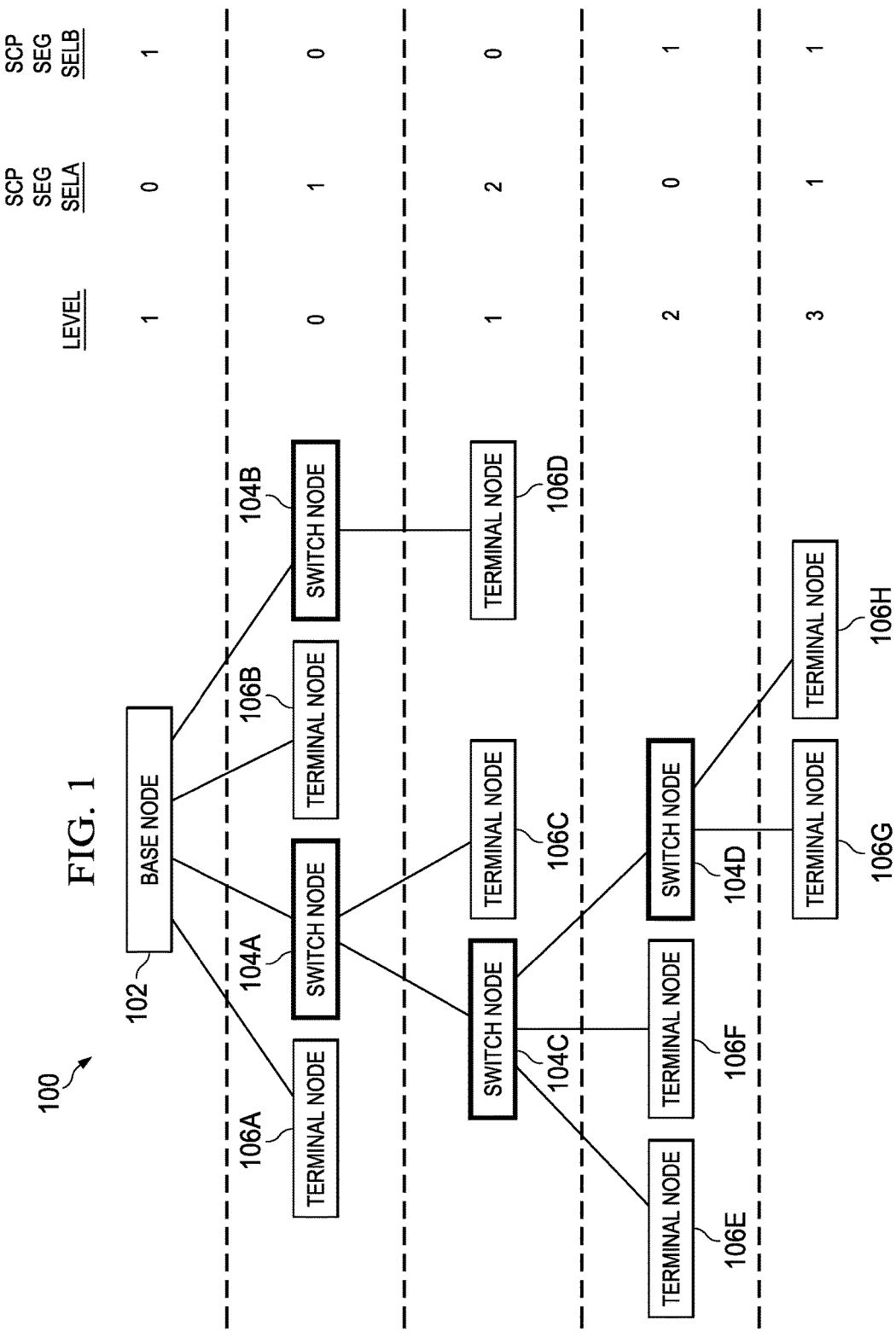
FIG. 1 shows a diagram of a hierarchical smart metering network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a hierarchical or tree-structured smart metering network, a data concentrator serves as the root node in the tree (also called a base node, BN). The metering devices in the network generally act as leaf nodes (also called a service node, SN) in the tree and send measurements back to the BN. Some of the metering devices are also selected to serve as switching nodes (SW), which act as the branch nodes in the tree. The switching nodes are able to relay data traffic through the network from its source (typically an SN) toward its destination (typically a BN) over distances beyond the direct communication reach of the transmitting SN. Powerline-Related Intelligent Metering Evolution (PRIME) is an exemplary smart-metering network standard for implementing a hierarchical power line network as explained above.

A hierarchical smart metering network, as described above, may include a collision avoidance protocol, such as carrier sense multiple access with collision avoidance (CSMA-CA). CSMA-CA requires that before initiating transmission, a node listens to the network and transmits only if transmission by another node is not detected (i.e., the network is idle). Unfortunately, in a smart metering network, nodes at different levels of the network hierarchy are often hidden from one another because a node at one level may not be able to detect the transmissions of a node at another level. Consequently, if two nodes at different levels of the smart metering network, each believing the network idle because neither can detect transmission by the other, simultaneously transmit to a given switch node, the transmissions will collide and both transmissions will be discarded.

In a hierarchical smart metering network, hidden nodes are ubiquitous and dropped packets resulting from collisions with transmissions from hidden nodes significantly reduce network performance. Embodiments of the present disclosure protect node transmissions from collisions with transmissions from hidden nodes, thereby improving the performance of hierarchical smart metering networks.

FIG. 1 shows a diagram of a hierarchical smart metering network 100 in accordance with various embodiments. The network 100 includes a base node 102, switching nodes 104A-104D, and terminal nodes 106A-106H. The number and arrangement of switching nodes 104 and terminal nodes 106 is exemplary, and in practice any number of switch nodes 104 and terminal nodes 106 may be included in a smart metering network. As described above, each terminal node 106A-H may be a utility meter, and each switch node 104A-H, which may also be a meter, passes data packets across levels of the network hierarchy between the base node 102 and a terminal node 106A-H.

Switch node 104C, switch node 104D, and terminal node 106H are respectively located at levels 1, 2, and 3 of the network 100. Due to signal attenuation in the network 100, nodes at alternate levels of the network 100 (e.g., levels 1 and 3, 0 and 2, and −1 and 1 are alternate levels) may be unable to detect each other's transmissions. Consequently, typical implementations of CSMA-CA may be ineffective at preventing collisions of transmissions originating within alternate levels of the network, for example, collision at the switch node 104D of simultaneous transmissions from the switch node 104C and the terminal node 106H. To avert such collisions, embodiments of the nodes 102, 104A-H, and 106A-H include logic configured to prevent collisions of transmissions originating at alternate levels (i.e., transmissions of hidden nodes) of the network 100.

Figure 2:
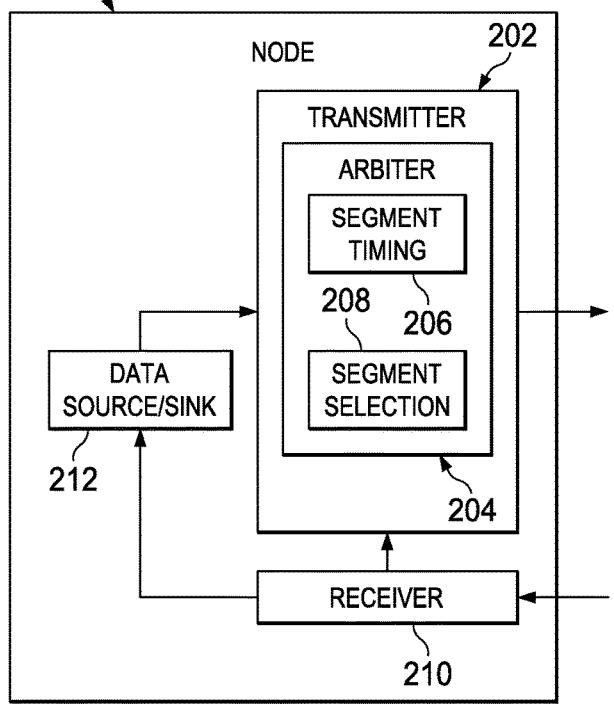
FIG. 2 shows a block diagram of a node suitable for use in a smart metering network in accordance with various embodiments.

FIG. 2 shows a block diagram of a node 200 suitable for use in a smart metering network in accordance with various embodiments. The node 200 may be employed in the network 100 as or part of any of the nodes 102, 104A-H, and 106A-H. The node 200 includes a transmitter 202, a receiver 210, and data sink/source logic 212. The receiver 210 includes media interface, signal detection, and decoding circuitry for receiving transmissions originating from other nodes. The receiver 210 provides data received to the data source/sink logic 212 for further processing. The receiver 210 may also provide information (e.g., timing information) extracted from received data to the transmitter 202.

The transmitter 202 transmits data (e.g., packets of data) received from the data source/sink logic 212 to a destination node via the network 100. The transmitter 202 includes media access circuitry and signal encoding circuitry that facilitate data transmission. In conjunction with the receiver 212 the transmitter may implement CSMA-CA. The transmitter 202 also includes an arbiter 204 that is configured to prevent collisions with transmissions originating at alternate levels of the network 100. The arbiter 204 includes segment timing logic 206 and segment selection logic 208 that operate to determine when the transmitter 202 may transmit without colliding with a transmission originating in an alternate level of the network 100.

Figure 3:
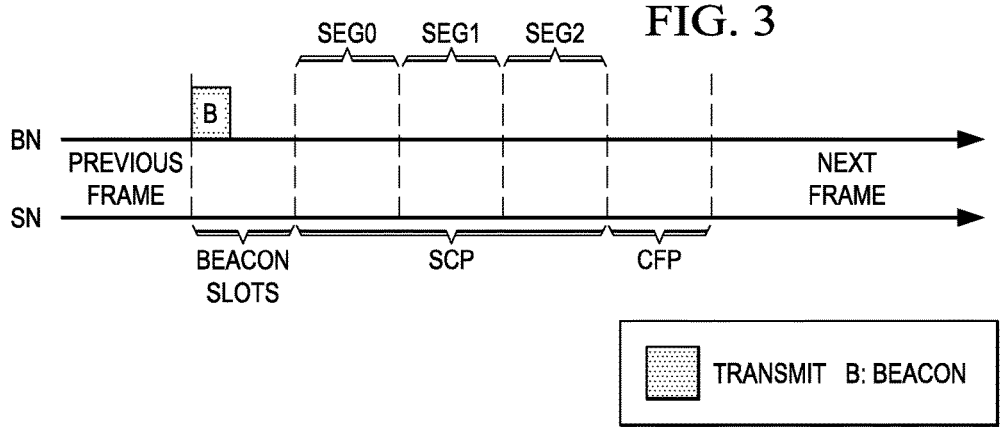
FIG. 3 shows a diagram of a transmission time frame used by nodes of a smart metering network to avoid collisions in accordance with various embodiments.

Operation of one embodiment of the transmitter 202 and associated arbiter 204 will now be explained with reference to FIG. 3. FIG. 3 shows a diagram of a transmission time frame 300 used by various embodiments of the node 200 in the network 100. As shown, time frames are synchronized across base nodes and service nodes (and switch nodes) of the network 100. The time frame 300 is partitioned into a portion reserved for beacon transmission (beacon slots), a portion reserved for contending transmissions (shared contention period (SCP)), and a portion reserved for contention free transmissions (contention free period (CFP)). The various portions (SCP, CFP) of the time frame 300 represent time intervals.

The beacon slots are used by the base node 102, and the switch nodes 104A-D, to send beacon transmissions. The beacon transmissions may be used by the terminal nodes 106A-H to synchronize their clocks and to define the start of the time frame 300 in time. The CFP is used only for communication without risk of collision between pre-selected pairs of nodes. During the SCP any node is allowed to transmit in accordance with the CSMA-CA protocol.

Embodiments of the transmitter 202, divide the SCP into a plurality of sub-portions that define time sub-intervals of the SCP used for transmission. In FIG. 3, the time sub-intervals of the SCP are denoted as Seg0, Seg1, and Seg2. While the time frame 300 includes an SCP divided into three time sub-intervals, other embodiments may include a different number of time sub-intervals. In the time frame 300, the time sub-intervals are illustrated as equal in length, but in some embodiments, the length of each time sub-interval may be configured based on traffic conditions on the network 100 or other factors. The segment timing logic 206 is configured to partition the SCP into the time sub-intervals Seg0, Seg1, and Seg2 based on predetermined timing of the time frame 300.

Each level of the hierarchical network 100 corresponds to one of the time-sub intervals Seg0, Seg1, and Seg2 of the time frame 300, and nodes residing at alternate levels of the network hierarchy correspond to different time sub-intervals. The segment selection logic 208 is configured to determine which of the time sub-intervals corresponds to the level of the hierarchical network at which the node 200 is located. The segment selection logic 208 may determine the hierarchical level of the node 200 based on the number of hops between the node 200 and the base node 102. The segment selection logic 208 is configured to enables the transmitter 202 to transmit during the SCP only during the SCP time sub-interval corresponding to the level of the network at which the node 200 is located. In this way, alternate levels of the network 100 are inhibited from transmitting at the same time during the SCP and do not collide with one another.

In one embodiment of the segment selection logic 210, if a node 200 is located at level n of the hierarchical network 100, and s≥3 is the number of time sub-intervals into which SCP is divided, then the node 200 is allowed to transmit only during SCP segment ((n+1)mod s). FIG. 1 shows network hierarchical level numbering, and shows SCP segment selection values based on ((n+1)mod 3) as SCP SEG SEL A. In accordance with SCP SEG SEL A, alternate levels transmit during different SCP time sub-intervals. For example, switch node 104C at level 1 transmits during Seg2 while terminal node 106H at level 3 transmits during Seg0, thereby preventing collision between the nodes 104C and 106H at switch node 104D. Thus, when a node is transmitting, hidden nodes within at least two hops of the node will not transmit at the same time as the node, and collisions due to hidden nodes are averted. Other embodiments of the segment selection logic 208 may associate levels and segments in a different manner (e.g., (n mod s)).

In another embodiment, the segment timing logic 206 is configured to divide the SCP into two time sub-intervals, which may be the same length or different lengths. In such an embodiment, the segment selection logic 208 is configured to allow the node 200 to transmit during the SCP only during one of the two time sub-intervals, where the time sub-interval is selected based on the level of the hierarchical network 100 at which the node 200 is located. Adjacent levels of the hierarchical network 100 are paired to form a level pair. For example, levels 0 and 1 of the network 100 may form a first level pair, and levels 2 and 3 of the network 100 may form a second level pair. Each node 200 located in a given level pair (e.g., the first level pair) transmits during the SCP only during the same one of the two time sub-intervals, while each node 200 located in a level pair adjacent to the given level pair transmits during the SCP only during the other one of the two time sub-intervals. FIG. 1 shows such SCP segment selection values based on ((n−1)&1) as SCP SEG SEL B. In accordance with SCP SEG SEL B nodes 200 at different levels (i.e., hidden from each other) transmit during different SCP time sub-intervals, thereby alleviating collisions between hidden nodes 200.

Figure 4:
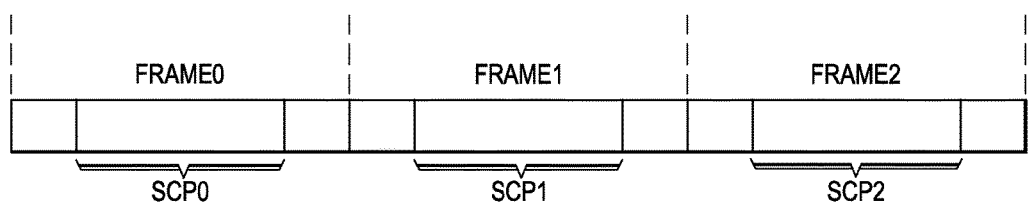
FIG. 4 shows a diagram of a group of time frames used by nodes of smart metering network to avoid collisions in accordance with various embodiments.

In another embodiment, the SCP is not divided into time sub-intervals, rather a plurality of sequential time frames 300 are grouped into a superframe by the segment timing logic 206 with the grouping synchronized across the network 100. Such an embodiment is advantageous when dividing the SCP would produce segments that are too short to transmit a packet of predetermined size. FIG. 4 shows a superframe 400 in accordance with various embodiments. The superframe 400 groups three time frames 300, labeled frame 0, frame 1, and frame 2, though other embodiments may include more than three time frames. Within the superframe 400, each entire SCP of a time frame is associated with a level of the hierarchical network 100, and a node 200 transmits only during the SCP associated with the level at which the node 200 is located. Thus, an embodiment of the segment selection logic 208 may associate SCP 0-2 with the levels of the network 100 in the same manner as explained above with regard to segments, where is the number of time frames 300 in the superframe 400.

In yet another embodiment, the entire SCP of one time frame of a set of sequential time frames is allocated to a level as explained above, but rather than grouping time frames 300 to form a superframe, the segment timing logic 206 assigns a changing numerical value (e.g., a count value) to each time frame 300. The segment selection logic 208 associates a time frame 300 with the level at which the node 200 is positioned in the network hierarchy in accordance with (n mod x==c mod x), wherein c is the time frame identification value (e.g., the time frame count value) and x≥3. Thus, such embodiments allocate the entire SCP rather than a sub-portion of the SCP, and advantageously provide that when a node 200 is transmitting, any hidden nodes within 2 hops of the node 200 will not also be transmitting, thereby eliminating potential transmission collisions caused by hidden nodes.

Various components of the node 200, including at least some portions of the segment timing logic 206 and the segment selection logic 208 can be implemented using a processor and software programming that causes the processor to perform the operations described herein. In particular, software programming can be used to cause a processor to associate an SCP or a timing sub-interval of an SCP to a level of the hierarchical network 100 at which the node 200 is located. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming executable by a processor can be stored in a computer readable storage medium. A computer readable storage medium comprises volatile storage such as random access memory, non-volatile storage (e.g., a hard drive, an optical storage device (e.g., CD or DVD), FLASH storage, or combinations thereof.

Some embodiments can implement portions of the arbiter 204, including the segment timing logic 206 and the segment selection logic 208 described herein using dedicated circuitry (e.g., dedicated circuitry implemented in an integrated circuit). Some embodiments may use a combination of dedicated circuitry and software executed by a processor. Selection of a hardware or software/processor implementation of embodiments is a design choice based on a variety of factors, such as cost, time to implement, and the ability to incorporate changed or additional functionality in the future.

Figure 5:
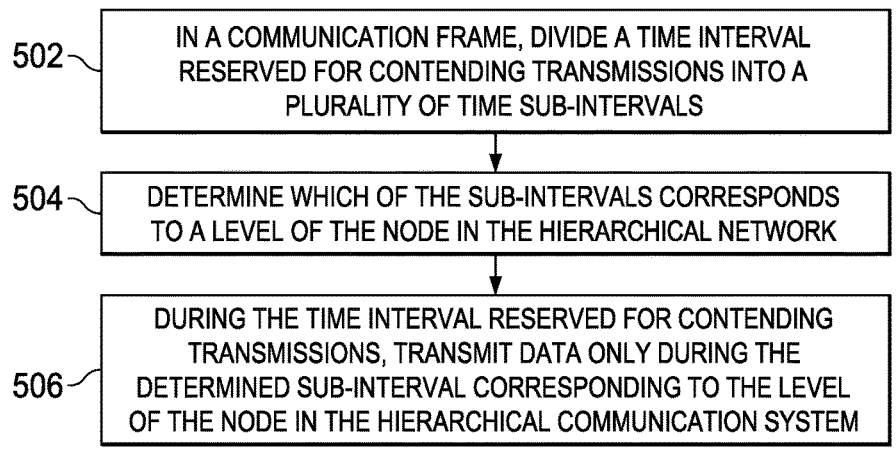
FIG. 5 shows a flow diagram for a first method for avoiding collisions in a smart metering network in accordance with various embodiments.

FIG. 5 shows a flow diagram for a method for avoiding collisions in a smart metering network in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 5, as well as other operations described herein, can be implemented as instructions stored in a computer readable medium and executed by a processor.

In block 502, the node 200 is operating in the hierarchical smart metering network 100. The arbiter 204 is identifying time frame boundaries based on, for example, beacon transmissions identified by the receiver 210. A portion of the time frame 300 is reserved for use with contending transmissions (i.e., the shared contention portion). The arbiter 204 identifies the shared contention portion of the time frame 300. The segment timing logic 206, divides the shared contention portion of the time frame 300 into a plurality of time sub-intervals. Embodiments divide the shared contention portion into at least two time sub-intervals. The time sub-intervals may be of equal length or of differing length as determined most suitable to meet network demands.

In block 504, the segment selection logic 208 determines which of the time sub-intervals corresponds to a level at which the node 200 is located in the hierarchical network 100. In some embodiments that divide the shared contention portion into at least three time sub-intervals, the segment selection logic 208 divides the level number at which the node is positioned by the number of time sub-intervals, and the remainder identifies the time sub-interval corresponding to the level of the node 200. In some embodiments that divide the shared contention portion into two time sub-intervals, the segment selection logic 208 groups adjacent network levels into level pairs, assigns nodes within a given level pair to use the same one of the two time sub-intervals, and assigns nodes within a level pair adjacent to the given level pair to use the other of the two time sub-intervals. The segment selection logic 208 ensures that transmissions from levels of the network hierarchy two levels apart occur in different time sub-intervals, thereby preventing collisions due to hidden nodes.

In block 506, during the shared contention period, the node 200 transmits a data packet only during the sub-interval that corresponds to the level of the hierarchical network 100 at which the node 200 is located.

Figure 6:
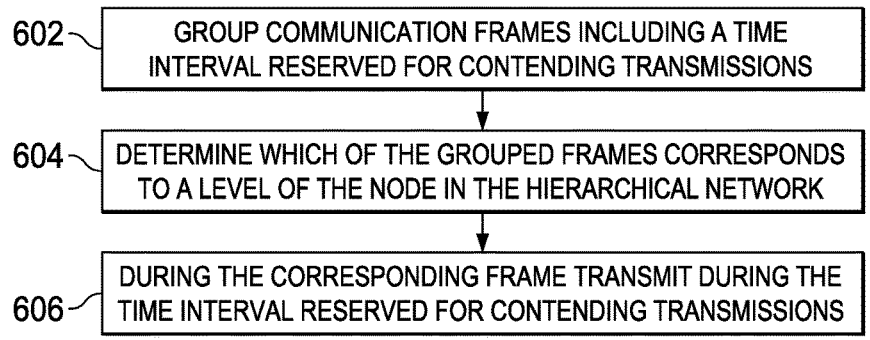
FIG. 6 shows a flow diagram for a second method for avoiding collisions in a smart metering network in accordance with various embodiments.

FIG. 6 shows a flow diagram for a method for avoiding collisions in a smart metering network in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 6, as well as other operations described herein, can be implemented as instructions stored in a computer readable medium and executed by a processor.

In block 602, the node 200 is operating in the hierarchical smart metering network 100. The arbiter 204 is identifying time frame boundaries based on, for example, beacon transmissions identified by the receiver 210. A portion of the time frame 300 is reserved for use with contending transmissions (i.e., the shared contention portion). The segment timing logic deems a predetermined number of time frames (e.g. 3 or more) to constitute a group of time frames.

In block 604, the segment selection logic 208 determines which of the grouped time frames corresponds to a level at which the node 200 is located in the hierarchical network 100. In some embodiments, the segment selection logic 208 divides the level number at which the node is located by the number of time frames grouped, and the remainder identifies the time frame corresponding to the level of the node 200. The segment selection logic 208 ensures that transmissions from levels of the network hierarchy within two levels of a given level occur in different time frames than that used by the given level, thereby preventing collisions due to hidden nodes.

In block 606, the node 200 transmits a data packet only during the shared contention portion of the time frame that corresponds to the level of the hierarchical network 100 at which the node 200 is located.

Figure 7:
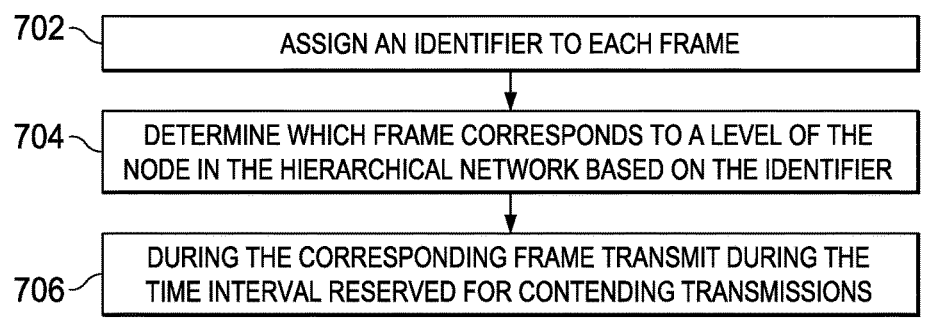
FIG. 7 shows a flow diagram for a third method for avoiding collisions in a smart metering network in accordance with various embodiments.

FIG. 7 shows a flow diagram for a method for avoiding collisions in a smart metering network in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 7, as well as other operations described herein, can be implemented as instructions stored in a computer readable medium and executed by a processor.

In block 702, the node 200 is operating in the hierarchical smart metering network 100. The arbiter 204 is identifying time frame boundaries based on, for example, beacon transmissions identified by the receiver 210. A portion of the time frame 300 is reserved for use with contending transmissions (i.e., the shared contention portion). The segment timing logic 206 assigns an identifier (e.g., a count value) to each time frame.

In block 704, the segment selection logic 208 determines which time frame corresponds to a level at which the node 200 is located in the hierarchical network 100. In some embodiments, the segment selection logic 208 associates the node 200 with a time frame wherein a modulo x of the time frame identifier equals a modulo x of the level of the node 200. The segment selection logic 208 ensures that transmissions from levels of the network hierarchy within two levels of a given level occur in different time frames than that used by the given level, thereby preventing collisions due to hidden nodes.

In block 706, the node 200 transmits a data packet only during the shared contention portion of the time frame that corresponds to the level of the hierarchical network 100 at which the node 200 is located.

Table 1 below shows simulation results for three different hierarchical smart meter network configurations. Each configuration was simulated using both CSMA-CA alone and CSMA-CA optimized with the collision prevention methods disclosed herein. The simulation results show that smart meter networks employing CSMA-CA alone suffer from a significant number of dropped packets due to collisions, while embodiments of the present disclosure virtually eliminate transmission collisions and the associated dropped packets.

TABLE 1

Simulation Results

|  | Rcvd Pkts | Collisions | Dropped/Rcvd |
|---|---|---|---|
| Topology 1: 5 nodes, 5 levels, BN-SW-SW-SW-SW | | | |
| CSMS-CA alone | 5933 | 500 | 8.43% |
| Optimized | 8696 | 0 | 0% |
| Topology 2: 9 nodes, 5 levels, BN-2SW-2SW-2SW-2SW | | | |
| CSMS-CA alone | 21035 | 2534 | 12.05% |
| Optimized | 39068 | 4 | 0.01% |
| Topology 3: 13 nodes, 5 levels, BN-3SW-3SW-3SW-3SW | | | |
| CSMS-CA alone | 43811 | 5898 | 13.46% |
| Optimized | 90090 | 12 | 0.01% |

The above discussion is meant to be illustrative of the principles and various embodiments of the present invention. Numerous variations and modifications will become apparent to those skilled in the art once the above disclosure is fully appreciated. For example, while disclosed embodiments have been discussed with reference to a hierarchical smart metering network, those skilled in the art will understand that various embodiments are also applicable to other implementations of a hierarchical network. It is intended that the following claims be interpreted to embrace all such variations and modifications.

What is claimed is:

1. A method, comprising:
providing a communication time frame with a time interval reserved for beacon transmissions followed by a time interval reserved for contending transmissions followed by a time interval reserved for contention free transmissions, the beacon transmissions being used to define a start of the communication time frame;
dividing the time interval reserved for contending transmissions into S time sub-intervals, where S is an integer greater than or equal to three;
determining, by a node of a hierarchical network, a remainder value that corresponds to (N+X) modulo S, where N is an integer that corresponds to a level of the node in the hierarchical network, and X is an integer;
determining, by the node of the hierarchical network, a single one of the time sub-intervals that corresponds to the remainder value, wherein the remainder value corresponds to only one of the time sub-intervals;
allowing, by the node of the hierarchical network, a transmitter to transmit during the time interval reserved for contending transmissions at any time during the determined one of the time sub-intervals that corresponds to the remainder value.

2. The method of claim 1, wherein S is equal to three.

3. The method of claim 1, further comprising providing the node as a component of a smart grid power line network.

4. The method of claim 1, further comprising configuring nodes located at alternate levels of the hierarchical network to transmit during different time sub-intervals.

5. The method of claim 1, wherein X is equal to 0.

6. A transmitter, comprising:
an arbiter configured to:
divide a time interval reserved for contending transmissions in a communication time frame into S time sub-intervals, where S is an integer greater than or equal to three, the communication time frame including a time interval reserved for beacon transmissions followed by the time interval reserved for contending transmissions followed by a time interval reserved for contention free transmissions, the beacon transmissions being used to define a start of the communication time frame;
determine a remainder value that corresponds to (N+X) modulo S, where N is an integer that corresponds to a level of a hierarchical network at which the transmitter is positioned, and X is an integer;
determine a single one of the time sub-intervals that corresponds to the remainder value, wherein the remainder value corresponds to only one of the time sub-intervals; and
allow the transmitter to transmit during the time interval reserved for contending transmissions at any time during the determined one of the time sub-intervals corresponding to the remainder value.

7. The transmitter of claim 6, wherein the hierarchical network is a smart grid power line network.

8. The transmitter of claim 6, wherein the arbiter is configured to divide the time interval reserved for contending transmissions into three time sub-intervals; and wherein a first of the three time sub-intervals corresponds to the level of the hierarchical network at which the transmitter is positioned, and a second and third of the three time sub-intervals correspond to levels adjacent to the level of the hierarchical network at which the transmitter is positioned.

9. The transmitter of claim 6, wherein S is equal to three.

10. The transmitter of claim 6, wherein the arbiter is configured to eliminate collisions in the time interval reserved for contending transmissions with transmissions from an alternate level of the hierarchical network.

11. The transmitter of claim 6, wherein X is equal to 0.

12. A transmitter for communicating on a smart grid power line network, comprising:
an arbiter configured to; assign a numerical value to each of a plurality of communication time frames by dividing a time interval reserved for contending transmissions into S time subintervals, where S is an integer greater than or equal to three:
determine a remainder value that corresponds to (N+X) modulo S, where N is an integer that corresponds to a level of a hierarchical network at which the transmitter is positioned, and X is an integer;
determine a single one of the communication time frames that corresponds to the remainder value, wherein the remainder value corresponds to only one of the communication time frames; and
allow a transmitter to transmit data during a time period reserved for contending transmissions at any time during the determined one of the communication time frames that corresponds to the remainder value.

13. The transmitter of claim 12, wherein the arbiter is configured to group a plurality of successive time frames, each time frame comprising a portion reserved for contending transmissions; wherein each of the plurality of available transmission intervals correspond to an entirety of the portion reserved for contending transmission of one of the plurality of successive time frames.

14. The transmitter of claim 13, wherein the arbiter is configured to group three time frames.

15. A method, comprising:
assigning, by a node of a hierarchical network, a numerical value to each of a plurality of communication time frames, each of the communication time frames including a time interval reserved for beacon transmissions followed by a time interval reserved for contending transmissions followed by a time interval reserved for contention free transmissions, the beacon transmissions being used to define a start of each of the communication time frames;
dividing the time interval reserved for contending transmissions into S time subintervals, where S is an integer greater than or equal to three;
determining, by the node of a hierarchical network, a remainder value that corresponds to (N+X) modulo S, where N is an integer that corresponds to a level of the node in the hierarchical network, and X is an integer;
determining, by the node of a hierarchical network, a single one of the communication time frames that corresponds to the remainder value, wherein the remainder value corresponds to only one of the communication time frames; and
allowing, by the node of a hierarchical network, a transmitter to transmit data during a period reserved for contending transmissions at any time during the determined one of the communication time frames that corresponds to the remainder value.

* * * * *